Nov. 9, 1943.        R. R. LEWIS ET AL        2,333,800
APPLICATOR OR ROLLER AND METHOD OF MAKING THE SAME
Original Filed Aug. 12, 1940
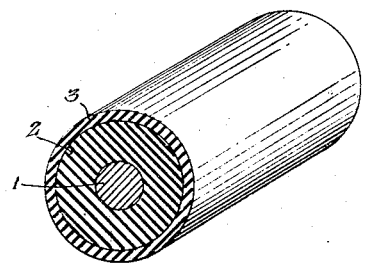
INVENTORS
Robert R. Lewis and Albert J. Weiss
BY Mock & Blum
ATTORNEYS Patented Nov. 9, 1943

2,333,800

UNITED STATES PATENT OFFICE 2,333,800

APPLICATOR OR ROLLER AND METHOD OF MAKING THE SAME

Robert R. Lewis, Baldwin, and Albert J. Weiss, Mineola, N. Y., assignors to Vulcan Proofing Company, New York, N. Y., a corporation of New York Original application August 12, 1940, Serial No. 352,308. Divided and this application May 23, 1941, Serial No. 394,955

3 Claims. (Cl. 91—67.8)

Our invention relates to a new and improved applicator or roller which can be used as an inking roller on a printing press, as a roller in a coating machine for applying lacquer, varnish, enamel and other purposes.

Our invention relates particularly to an inking roller or the like, which has a surface layer of an improved composition.

Another object of our invention is to provide an inking roller or the like, which has a surface layer or peripheral layer which is soft, resilient, and resistant to the action of numerous solvents and liquids, such as oils, pyroxylin lacquers and other types of lacquers, varnishes, enamels, etc.

Other objects of the invention are stated in the annexed description and drawing.

The drawing diagrammatically illustrates an inking roller or the like which is made according to the invention.

This roller has a core 1, a body 2, and a surface layer 3.

While the invention is not limited to the ingredients or proportions specified herein, the following is given as a preferred formula for making the surface layer 3:

*Formula A*

| | Pounds |
|---|---|
| C stage "Glyptal" resin (1353U) | 100 |
| "Bakelite-Glyptal" casting resin (H529) | 12.5 |
| Chloroprene | 15.5 |
| Wood rosin | .75 |
| Pine tar | .2 |
| Magnesium oxide | 1.5 |
| Zinc oxide | .75 |
| Phenyl beta naphthylamine | .35 |
| Soft brown factice | 7.75 |
| Hard brown factice | 7.75 |
| Cottonseed oil | .50 |
| Coumarone resin | 4.75 |
| | 152.30 |

The C stage "Glyptal" resin is the essential ingredient of the mixture. This is a soft rubberlike resin and is one of the resins formed by the interaction of glycerine and polybasic organic acids which have come to be known as "Glyptal" resins or alkyd resins (see Synthetic Resins and Their Plastics, by Ellis, 1923 edition, pages 293–298). In manufacturing the resins which have been found satisfactory for this purpose, the reaction is carried out in the presence of adipic acid. (The manufacture of this type of flexible, resilient synthetic resin is disclosed in U. S. Patent No. 1,897,260.) The proportion of adipic acid controls the hardness of the finished product. The resin which we prefer to use for most printing rolls requiring a soft face is designated by the manufacturer, General Electric Corporation, as #1353U and is a mixture of fifteen parts of "Glyptal" resin and one part of adipic acid. This mixture is suitably reacted with heat to bring it to the "C" stage. Synthetic rubber which is made by polymerizing chloroprene, is also known under the name of "duprene." As stated in vol. 2, p. 335, of the supplement to Thorpe's "Dictionary of Applied Chemistry," published in 1935, "duprene" is chloroprene caoutchouc, which is obtained by the polymerization of chloroprene.

The compound is mixed on a regulation rubber mill using the following procedure:

The chloroprene polymer is put on the mill first and brought to a plastic condition, the wood rosin and coumarone resin, which serve as softeners are added first and thoroughly incorporated. The magnesium oxide, which serves to stabilize the plastic chloroprene by neutralizing acidity, is incorporated next. The phenyl beta naphthylamine, which is a stabilizer, and pine tar are added next. The pine tar serves to accelerate subsequent polymerization of the chloroprene polymer and also to mask its odor. Zinc oxide, which serves as the chief accelerator of subsequent curing of the chloroprene, is added next. The two factices and the cottonseed oil are added next. These materials also serve as softeners for the chloroprene polymer. All of these ingredients are thoroughly incorporated with the chloroprene polymer and the batch is now a soft plastic mass which can be readily handled on a rubber mill by one skilled in the art. This batch is now removed from the mill and set aside while the first two ingredients are mixed together. The casting resin is put on the mill first. This is a mixture of a phenol formaldehyde resin ("Bakelite") and a B-stage "Glyptal" resin. It is a soft, sticky mass of about the consistency of soft tar. It is a light reddish tan in color. This material immediately smears all over the mill rolls. The C-stage "Glyptal" resin (1353U) which has been previously ground to a uniform powder, is now dumped on the mill. This "Glyptal" resin as made is in the form of rather firm, resilient, almost transparent lumps. By repeatedly passing these lumps through a tight mill they are broken up into a powdery form similar in appearance to white factice which has been ground by similar treatment. The mastication of the mill rolls, which are set tightly together, causes the "Glyptal" resin to be taken up by the casting resin. As the mastication continues the mixture gradually forms a sheet which adheres to the back roll (fastest roll) of the mill. The back roll must be equipped with a scrape knife which is now used to produce a homogeneous mixture. By scraping the sheet off the roll the entire amount of material is caused to pass through the mill rolls. This process is repeated several times until a uniform product results. The original batch which has been prepared with "duprene" is now put back on the mill with the "Glyptal" resin mixture and the whole batch is thoroughly milled together until homogeneous. The entire mixture now resembles a rubber compound in characteristics and may be milled and calendered in the same manner as a rubber compound.

The incorporation with the "Glyptal" of the "duprene" and the other materials, serves very important purposes in the material as finally manufactured. A material can be made from the "Glyptal" resin and casting resin alone but such a material has several serious shortcomings. Its oil and solvent resistance are splendid, much greater than the resistance of rubber, but its stability and mechanical resistance are very poor. It is very low in abrasion resistance, shearing resistance and tensile strength. In other words it would be seriously damage by impact with sharp raised surfaces on a press. It would be unstable in the presence of heat and moisture and liable to break down suddenly into a sticky mass having no serviceability whatsoever. The chloroprene polymer mixture serves to stabilize the "Glyptal" resin. It strengthens and toughens the mixture and stabilizes it so that the danger of dejelling mentioned above no longer exists.

The mixture made in accordance with the description given above is now calendered in preparation for its application as the cover of a roll such as a printer's roll. It is calendered on a regular three-roll calender to any desired width and thickness. We prefer a thickness of about .040 to .050 inch run in one ply. If greater thickness is desired it may be plied up in the regular manner in any desired thickness. As the mixture comes from the calender it is wrapped in a clean cloth liner.

Rollers may be covered with this "Glyptal" mixture (Formula A) for the entire depth of coverage down to the metal core 1 or a base 2 of soft rubber may be applied first and then a thin layer of Formula A applied as an outside face covering 3, about one-eighth of an inch thick. The latter procedure is desirable in most cases because of lower cost and greater softness.

If the entire roll covering is made from Formula A, the metal core is prepared by first cleaning with a sand blast and then applying a brush coat of a "Bakelite" lacquer. The covering is then wrapped tightly around the core spirally until the diameter is at least one-quarter inch greater than the finished diameter desired. Kraft paper is wrapped around the roll and a sheet of galvanized iron is then tightly applied, held in place with spiral wrapping of narrow fabric tape. The roll is then heated in an atmosphere of hot air at a temperature of 300° F. for two hours. After cooling the roll is then buffed in a lathe to the finished diameter desired and polished with fine emery cloth.

If only the surface stock is to be made from Formula A, it is necessary to first cover the roll with rubber. The following rubber compound serves as a satisfactory base compound for soft rolls. This compound may be varied to produce rolls of different firmness.

Formula B

| | Pounds |
|---|---|
| Smoked sheet rubber | 50.0 |
| Coumarone resin | 16.5 |
| Zinc oxide | 2.5 |
| Soft brown factice | 15.0 |
| Phenyl beta naphthylamine | .5 |
| Sulphur | 3.0 |
| Stearic acid | .5 |

This compound is milled and calendered in the conventional manner in preparation for building the roll. The metal core is cleaned by sandblasting and one ply of rubber compound which will vulcanize hard is applied to bond firmly to the core. Sheets of Formula B calendered to a thickness of about .075" are then wrapped in the form of a spiral around the core until the diameter is about equal to the finished diameter desired. A layer of paper is then applied followed by the application of a sheet of galvanized iron tightly wrapped and held in place with spiral wrappings of narrow fabric tape. This roll is then vulcanized by heating at a temperature of 278° F. for four hours. After cooling the roll is buffed in a lathe to a diameter one-quarter inch less than the finished diameter desired and the ends are buffed down to the core to give a length one inch less than the finished length desired. The surface is then painted with a solution of a fast curing, tacky rubber compound. After the solvent has evaporated, the surface covering is applied using material made in accordance with Formula A. The same procedure is used as that outlined in covering a roll without the rubber base except that the ends must be covered with Formula A to prevent the oils and solvents from attacking the rubber. Printing ink is usually linseed oil varnish, which attacks rubber. The ends are covered in the following manner: A strip of hard curing rubber one-half inch wide is applied on each end. A strip of Formula A one inch wide is then wrapped on each end until the diameter is built up to the diameter of the rubber base. The entire surface is then built up to a diameter one-quarter inch greater than the finished diameter desired. The roll is wrapped as described above and heated for two hours at 300° F. After cooling the roll is buffed in a lathe to the desired length and diameter.

The procedure outlined above, using a rubber base, will produce a roll which will have a hardness of about 21 as determined by the Shore Durometer. A roll built up solid from the core without a rubber base will have a Shore hardness of about 25. The softer roll will be more desirable for some kinds of typographic printing but the harder roll will suffice for printing from planographic plates and for some of the typographic printing. The harder roll will also suffice for use as a coating machine roller where no indented surfaces are encountered or it will serve as an inking roller for use with intaglio plates.

The proportion of the various softening ingredients incorporated with the "duprene" influences the hardness to some extent, but as stated above, the hardness of the C stage "Glyptal" resin primarily determines the hardness of the finished roll. The Shore hardness test stated above is about the lowest reading that can be obtained but it is possible to increase this hardness to any extent desired.

In order to give practical examples of all the features of our invention, suitable formulas for the hard rubber base and for the cementing compounds are as follows:

*Formula for hard rubber base*

| | Pounds |
|---|---|
| Smoked sheet | 42.5 |
| Zinc oxide | 35 |
| Sulphur | 22.5 |
| Whole tire reclaim | 15 |
| Carbon black | 5 |
| Tetramethylthiuram monosulphide | 1.25 |

*Formula for fast curing tacky rubber compound which bonds the surface compound to the rubber base*

| | Pounds | Ounces |
|---|---|---|
| Smoked sheet | 52 | 10 |
| Coumarone resin | 25 | — |
| Sulphur | 2 | 3 |
| Zinc oxide | 5 | — |
| Whiting | 10 | — |
| Lithopone | 10 | — |
| Tetramethylthiuram monosulphide | | 3¾ |
| Trimene base | — | 8 |

The completed coating material, prior to the heat treatment is plastic, and it resembles unvulcanized rubber in its physical properties. That is, the unheated compound can be readily calendered so as to form a tough and coherent layer or sheet of material which can be handled and applied in the dry form and without using any solvents.

We do not wish to be limited to the use of all of the ingredients above mentioned, in making the protective layer or coating, as a number of the ingredients mentioned in Formula A can be omitted without departing from the invention, since said formula is intended to represent the best embodiment of the invention.

It will be noted that the "duprene" which is referred to in Formula A is added to the remainder of the compound prior to the polymerization thereof. This polymerization is produced by the zinc oxide, during the heat treatment which is previously mentioned.

This application is a division of application Serial No. 352,308, filed August 12, 1940, on which U. S. Patent No. 2,243,386 has been issued on May 27, 1941. Said application Serial No. 352,308 was a continuation in part of No. 688,584, filed September 8, 1933, and of No. 231,180, filed September 22, 1938.

We claim:

1. The method of making a printing roll which comprises winding on a core provided with a partially vulcanized soft rubber surface the requisite number of layers of a composition comprising alkyd resin and a plastic polymer of chloroprene, securing the end surfaces of the roll and tightly binding the outer of said layers with a porous covering, vulcanizing in dry heat to the desired surface hardness, cooling, removing the coverings and machining the roller surface to size.

2. A printing roll comprising a core surfaced with a resilient, rubber-like, oil-resistant layer of substantial thickness comprising the product of vulcanization under heat of a composition containing alkyd resin, a plastic polymer of chloroprene and vulcanizing agent.

3. A printing roll comprising a core surfaced with a resilient, rubber-like, oil-resistant layer of substantial thickness comprising the product of vulcanization under heat of a composition containing alkyd resin, a plastic polymer of chloroprene and vulcanizing agent, said alkyd resin being the product of reaction of glycerine, phthalic anhydride, glycol and dibasic aliphatic acid.

ROBERT R. LEWIS.
ALBERT J. WEISS.